(12) United States Patent
Inoue et al.

(10) Patent No.: US 6,430,494 B1
(45) Date of Patent: Aug. 6, 2002

(54) PRECEDING VEHICLE FOLLOWING CONTROL APPARATUS AND METHOD FOR AUTOMOTIVE VEHICLE

(75) Inventors: Hideaki Inoue, Yokohama; Youji Seto, Kanagawa; Yousuke Kobayashi, Yokohama, all of (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/605,536

(22) Filed: Jun. 29, 2000

(30) Foreign Application Priority Data

Jun. 30, 1999 (JP) .............................. 11-186496

(51) Int. Cl.[7] .............................. G06F 7/00; G01S 13/00
(52) U.S. Cl. .............................. 701/96; 701/93; 342/47; 342/70; 342/71; 340/903; 340/435
(58) Field of Search ........................ 701/96, 93; 342/70, 342/71, 46, 47; 340/901, 903, 435, 436

(56) References Cited

U.S. PATENT DOCUMENTS 5,959,572 A   9/1999   Higashimata et al. .......... 342/70

FOREIGN PATENT DOCUMENTS

JP          6-320983        11/1994

*Primary Examiner*—Yonel Beaulieu
(74) *Attorney, Agent, or Firm*—Foley & Lardner

(57) ABSTRACT

In preceding vehicle following control apparatus and method for an automotive vehicle, a vehicular velocity controller includes a target inter-vehicle distance calculating section that calculates a target inter-vehicle distance from the vehicle to a preceding vehicle detected by an inter-vehicle distance sensor on the basis of a vehicular velocity detected by a vehicular velocity detector and an inter-vehicle distance detected by an inter-vehicle distance detector, a first vehicular velocity controlling section that performs a vehicular velocity control to bring the detected inter-vehicle distance substantially coincident with the target inter-vehicle distance, and a vehicular deceleration stopping section that performs a vehicular deceleration control to stop the vehicle in accordance with the inter-vehicle distance from the vehicle to the preceding vehicle immediately before a time point at which the inter-vehicle distance detector which trapped the presence of the preceding vehicle has not detected the preceding vehicle when the detected vehicular velocity falls in a low vehicular velocity region lower than a predetermined velocity value and -the inter-vehicle distance detector which trapped the presence of the preceding vehicle has not detected the preceding vehicle.

11 Claims, 9 Drawing Sheets

PRECEDING VEHICLE FOLLOWING CONTROL APPARATUS AND METHOD FOR AUTOMOTIVE VEHICLE

BACKGROUND OF THE INVENTION:

1. Field of the Invention

The present invention relates to preceding vehicle following control apparatus and method for an automotive vehicle which perform a vehicular run control to follow a preceding vehicle which is running ahead of the vehicle maintaining an inter-vehicle distance from the vehicle to the preceding vehicle at a target inter-vehicle distance.

2. Description of the Related Art

A Japanese Patent Application First Publication No. Heisei 6-320983 published on Nov. 22, 1994 exemplifies a previously proposed preceding vehicle following control apparatus for an automotive vehicle.

In the above-described previously proposed preceding vehicle following control apparatus, when the preceding vehicle has disappeared from a detection zone of an inter-vehicle distance sensor which is installed on the vehicle while the vehicle follows a preceding vehicle, an acceleration/deceleration target value which is immediately before the preceding vehicle has disappeared therefrom is held for a predetermined time duration. Hence, in a case where the preceding vehicle cannot be detected by means of the inter-vehicle distance sensor during a deceleration of the preceding vehicle due to some cause, the vehicle is decelerated for the predetermined time duration approximately at the same deceleration as the preceding vehicle.

SUMMARY OF THE INVENTION

The above-described previously proposed preceding vehicle following control apparatus holds the acceleration/deceleration target value immediately before the preceding vehicle has disappeared from the detection zone of the inter-vehicle distance sensor during the preceding vehicle following of the vehicle when the preceding vehicle has disappeared therefrom. However, there is often a case where the vehicle is gradually accelerated when the preceding vehicle has disappeared therefrom. Especially, since the inter-vehicle distance to the preceding vehicle is short while the vehicle is running at a relatively low vehicular velocity, there are many cases to give a mismatch to a vehicular driver's sense of vehicular driving.

It is, therefore, an object of the present invention to provide preceding vehicle following control apparatus and method for the automotive vehicle which make the vehicle stop without giving the mismatch to the vehicular driver's sense of vehicular driving when the vehicle is running in the preceding vehicle following control at a low vehicular velocity region and the preceding vehicle has not been detected by an inter-vehicle distance detector.

According to one aspect of the present invention, there is provided a preceding vehicle following control apparatus for an automotive vehicle, comprising: a vehicular velocity detector to detect a vehicular velocity of the vehicle; an inter-vehicle distance detector to trap a presence of a preceding vehicle which is running ahead of the vehicle and to detect an inter-vehicle distance from the vehicle to the trapped preceding vehicle; a driving force controller to control a driving force transmitted from a prime mover to a road wheel axle; a brake controller to control a braking force applied to road wheels of the vehicle; and a vehicular velocity controller including a target inter-vehicle distance calculating section that calculates a target inter-vehicle distance on the basis of the vehicular velocity detected by the vehicular velocity detector and the inter-vehicle distance detected by the inter-vehicle distance detector, a first vehicular velocity controlling section that performs a vehicular velocity control such that the vehicle follows up the preceding vehicle maintaining the inter-vehicle distance at the target inter-vehicle distance through at least one of the driving force controller and the brake controller to bring the detected inter-vehicle distance substantially coincident with the target inter-vehicle distance, and a vehicular deceleration stopping section that performs a vehicular deceleration control in accordance with the inter-vehicle distance from the vehicle to the preceding vehicle immediately before a time point at which the inter-vehicle distance detector which trapped the presence of the preceding vehicle has not detected the preceding vehicle to stop the vehicle when the vehicular velocity detected by the vehicular velocity detector falls in a low vehicular velocity region lower than a predetermined velocity value and the inter-vehicle distance detector which trapped the presence of the preceding vehicle has not detected the preceding vehicle.

According to another aspect of the present invention, there is provided a preceding vehicle following control method for an automotive vehicle, comprising: detecting a vehicular velocity of the vehicle; trapping a presence of a preceding vehicle which is running ahead of the vehicle and to detect an inter-vehicle distance from the vehicle to the trapped preceding vehicle; controlling a driving force transmitted from a prime mover to a road wheel axle; controlling a braking force applied to road wheels of the vehicle; calculating a target inter-vehicle distance on the basis of the detected vehicular velocity and the detected inter-vehicle distance; performing a vehicular velocity control such that the vehicle follows up the preceding vehicle maintaining the inter-vehicle distance at the target inter-vehicle distance through controlling at least one of the driving force and the braking force to bring the detected inter-vehicle distance substantially coincident with the target inter-vehicle distance; and performing a vehicular deceleration control in accordance with the inter-vehicle distance from the vehicle to the preceding vehicle immediately before a time point at which the trapped preceding vehicle has not been detected when the detected vehicular velocity falls in a low vehicular velocity region lower than a predetermined velocity value and the trapped preceding vehicle has not been detected.

This summary of the invention does not necessarily describe all necessary features so that the invention may also be a sub-combination of these described features.

DETAILED DESCRIPTION OF THE PREFERRED EMBODIMENTS

Reference will hereinafter be made to the drawings in order to facilitate a better understanding of the present invention.

(First Embodiment)

Figure 1A:
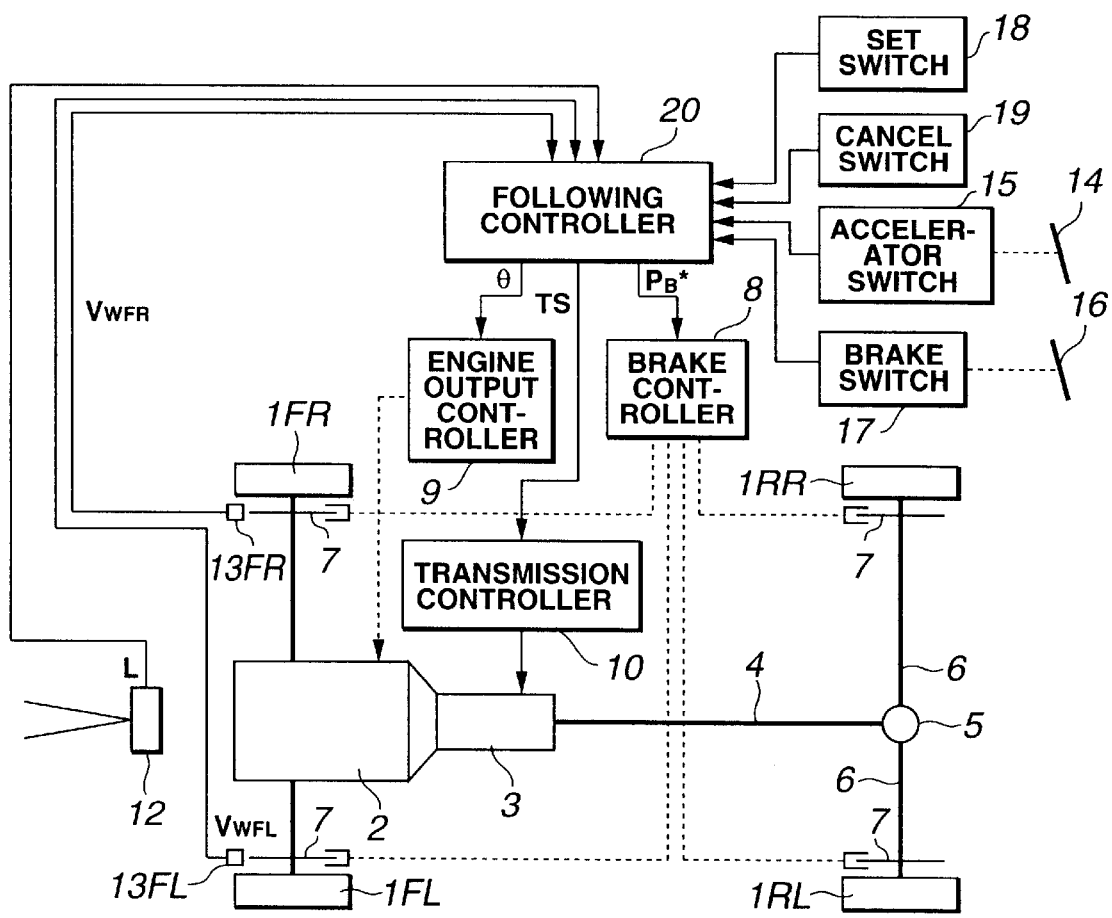
FIG. 1A is a schematic circuit block diagram of a first preferred embodiment of a preceding vehicle following control apparatus according to the present invention.

FIG. 1A shows a rough configuration representing a rear-wheel driven vehicle to which a first preferred embodiment of a preceding vehicle following control apparatus according to the present invention is applicable.

In FIG. 1A, 1FL and 1FR denote front left and right road wheels as non-driven wheels and 1RL and 1RR denote rear left and right road wheels as driven wheels.

The rear left and right road wheels 1RL and 1RR are rotationally driven to which a driving force of an engine 2 is transmitted via an automatic transmission 3, a propeller shaft 4, a final speed-reduction unit 5, and a wheel axle 6.

A disc brake 7 is installed on each of the front and rear left and right road wheels 1FL, 1FR, 1RL, and 1RR to develop a braking force and a braking liquid pressure (a brake hydraulic) to each disc brake 7 is controlled by means of a brake controller 8.

It is noted that the brake controller 8 develops the braking liquid (oil) pressure in accordance with a depression depth of a brake pedal (which corresponds to a brake manipulator, in a broad sense of term) and in accordance with a braking pressure command value from a following controller 20.

An engine output controller 9 is disposed on an engine 2 to control an output of the engine 2. The engine output controller 9 has adopted one of two engine output control methods, i.e., a method of adjusting an opening angle of a throttle valve of the engine 2 to control an engine speed and another method of adjusting an opening angle of an idle control valve of the engine 2 to control an idling speed of the engine 2. In the first embodiment, the method of adjusting the opening angle of the engine throttle valve is adopted.

A transmission (A/T) controller 10 is disposed on an automatic transmission 3 to control a gear position of the transmission 3. The transmission controller 10 is so arranged that when an up-shift/down-shift command value TS is received from the following controller 20 as will be described later, the gear position of the transmission 3 is controlled to be shifted up or shifted down, as will be described later.

On the other hand, an inter-vehicle distance sensor 12 constituted by a radar unit is disposed on a front lower end portion of the vehicle which sweeps a laser light beam in a front width-wise direction (so-called, a detection zone) of the vehicle and receives a reflected light beam from an object which is a preceding vehicle running ahead of the vehicle. The inter-vehicle distance sensor 12 traps a presence of the preceding vehicle and detects an inter-vehicle distance from the vehicle to the preceding vehicle as inter-vehicle distance detecting means.

In the vehicle shown in FIG. 1A, two wheel velocity sensors 13FL and 13FR which detect wheel velocities of, for example, the front left and right road wheels 1FL and 1FR which are the non-driven wheels, an accelerator switch 15 which detects a depression of an accelerator pedal 14 (which corresponds to an accelerator in a broad sense of term), a brake switch 17 which detects a depression of the brake pedal 16, a set switch 18 which serves to set a following control, and a cancel switch 19 which serves to instruct a halt of the following control.

The following controller 20 receives each output signal from the inter-vehicle distance sensor 12, the wheel velocity sensors 13FL and 13FR, the accelerator switch 15, the brake switch 17, the set switch 18, and the cancel switch 19.

Figure 2:
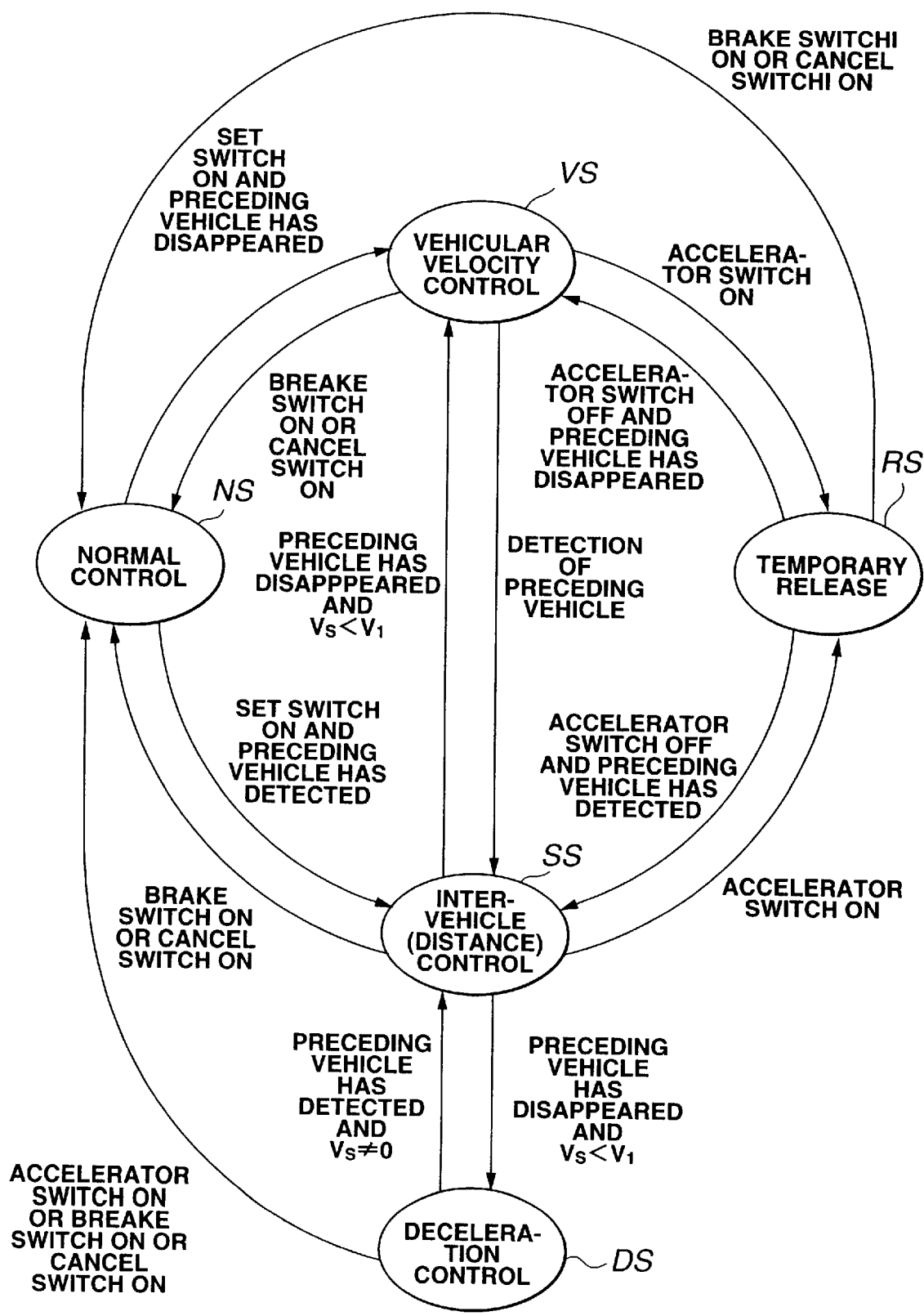
FIG. 2 is a state transition diagram (STD) representing transition states in the following controller shown in FIGS. 1A and 1B.

The following controller 20, in accordance with a state transition diagram representing transition states on the following control shown in FIG. 2, is managed into five control states, viz., a normal control state VS such that the following control is not carried out; a vehicular velocity control state VS such that the vehicular velocity is maintained at a set vehicular velocity with no preceding vehicle detected; an inter-vehicle (distance) control state SS such that the preceding vehicle is detected; a temporary release state RS such that the following control is temporarily released; and a deceleration control state DS such that the preceding vehicle has disappeared from the detection zone and the vehicle is running at a low vehicular velocity region.

In details, the state transition from the normal control state NS to the vehicular velocity control state VS occurs when, in the normal control state NS in which no following control is carried out, the set switch 18 is turned on and the preceding vehicle is not trapped by means of the inter-vehicle distance sensor 12. The state transition from the vehicular velocity control state VS to the normal control state NS occurs when, in the vehicular velocity control state VS, either the brake switch 17 or the cancel switch 19 is turned on. The state transition from the vehicular velocity control state VS to the temporary release state RS occurs when, in the vehicular velocity control state VS, the accelerator switch 15 is turned on. The state transition from the vehicular velocity control state VS to the temporary release state VS occurs when, in the vehicular velocity control state VS, the inter-vehicle distance sensor 12 has trapped the preceding vehicle.

In addition, the state transition from the normal control state NS to the inter-vehicle distance control state SS occurs when, in the normal control state NS, the set switch 18 is turned on and the inter-vehicle distance sensor 12 has trapped the preceding vehicle. The state transition from the inter-vehicle distance control state SS to the vehicular velocity control state VS occurs when, in the inter-vehicle distance control state SS, the preceding vehicle is not trapped and the vehicular velocity Vs is higher than a predetermined velocity value $V_1$ representing an upper limit of the low vehicular velocity region. The state transition from the inter-vehicle distance control state SS to the acceleration control state DS occurs when, in the inter-vehicle distance control state SS, the preceding vehicle becomes a non-trapped state and the vehicular velocity of the vehicle Vs is lower than the predetermined vehicular velocity value $V_1$ which corresponds to an upper limit value $V_L$ or $V_H$ to be described later. The state transition from the inter-vehicle distance control state SS to the temporary release state RS occurs when, in the inter-vehicle distance control state SS, the accelerator switch 15 is turned on. The state transition from the inter-vehicle distance control state SS to the normal control state NS occurs when, in the inter-vehicle distance control state SS, either the brake switch 17 or the cancel switch 19 is turned on.

Furthermore, the state transition from the temporary release state RS to the vehicular velocity control state VS occurs when, in the temporary release state RS, the accelerator switch 15 is turned off and no preceding vehicle is trapped. The state transition from the temporary release state RS to the inter-vehicle distance control state SS occurs when, in the temporary release state, the accelerator switch 15 is turned off and no preceding vehicle is trapped. The state transition from the temporary release state RS to the inter-vehicle distance control state SS occurs when, in the temporary release state RS, the accelerator switch 15 is turned off and the preceding vehicle has been trapped.

Figure 1B:
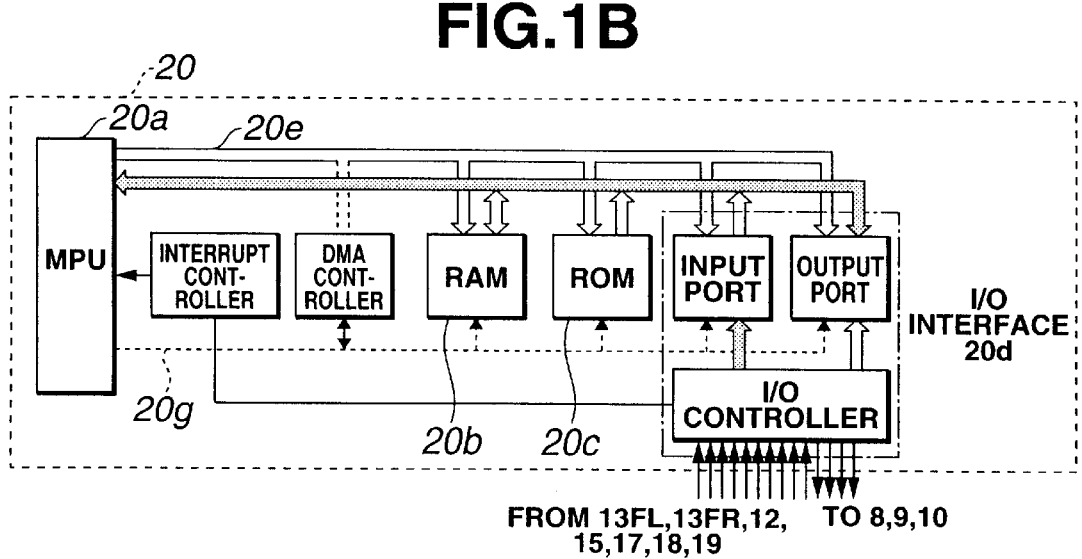
FIG. 1B is a schematic internal circuit block diagram of a following controller shown in FIG. 1A.

The state transition from the deceleration control state DS to the inter-vehicle distance control state SS occurs when, in the deceleration control state DS, the preceding vehicle is trapped and the vehicular velocity Vs does not indicate zero. The state transition from the deceleration control state NS to the normal control state NS occurs when, in the deceleration control state DS, any one of the accelerator switch 15, the brake switch 17, and the cancel switch 19 is turned on. It is noted that the following run controller 20 includes a microcomputer whose basic structure is shown in FIG. 1B. In FIG. 1B, the microcomputer has an MPU 20a (MircoProcesser Unit), an interrupt controller, DMA (Direct Memory Access) controller, RAM 20b (Random Access Memory), ROM 20c (Read Only Memory), an I/O interface 20d having an input port, an output port, and I/O controller, an address bus 20e, a data bus 20f, and a control bus 20g.

Figure 3:
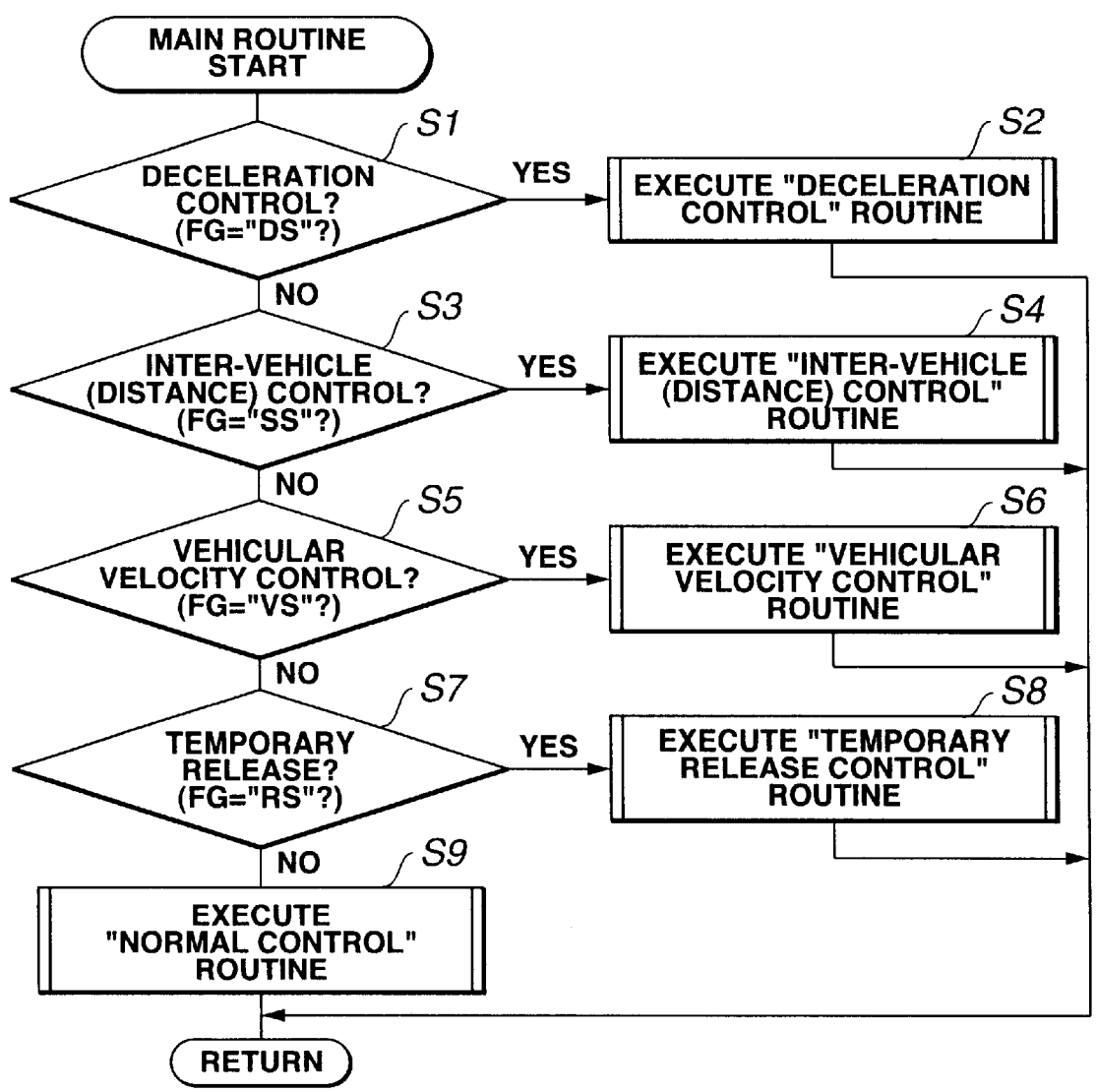
FIG. 3 is an operational flowchart representing an example of a preceding vehicle following control procedure executed in the following controller shown in FIGS. 1A and 1B.

Next, FIG. 3 shows a following control procedure executed in the following controller 20 for explaining an operation of the first preferred embodiment of the preceding vehicle following control apparatus shown in FIG. 1A.

The following control procedure shown in FIG. 3 is executed as a main routine.

At a step S1, the following controller 20 determines if a control state flag FG is set to "DS" specifying the deceleration control state.

If FG="DS" (Yes) at the step S1, the routine goes to a step S2.

At the step S2, the following controller 20 executes a deceleration control processing routine as will be described later and the main routine of FIG. 3 is returned to the step S1.

If FG="DS" (Yes) at the step S1, the routine goes to a step S2.

At the step S2, the following controller 20 executes a deceleration control processing routine as will be described later and the main routine of FIG. 3 is returned to the step S1.

If FG≠"DS" (No) at the step S1, the main routine goes to a step S3.

At the step S3, the following controller 20 determines if the control state flag FG is set to "SS" specifying the inter-vehicle distance control state.

If FG="SS" (yes) at the step S3, the main routine goes to a step S4. At the step S4, the following controller 20 executes an inter-vehicle distance control processing routine as will be described later and the main routine is returned to the step S1.

If FG="SS" at the step S3 (No), the main routine goes to a step S5.

At the step S7, the following controller 20 determines if the control state flag FG is set to "RS" specifying the temporary release state.

If FG="RS" (Yes) at the step S7, the main routine goes to a step S8. At the step S8, the following controller 20 executes a temporary release processing routine as will be described later and the main routine is returned to the step S1.

If FG≠"RS" (No) at the step S7, the routine goes to a step S9.

At the step S9, the following controller 20 executes a normal control processing routine as will be described below and the main routine is returned to the step S1.

Figure 4:
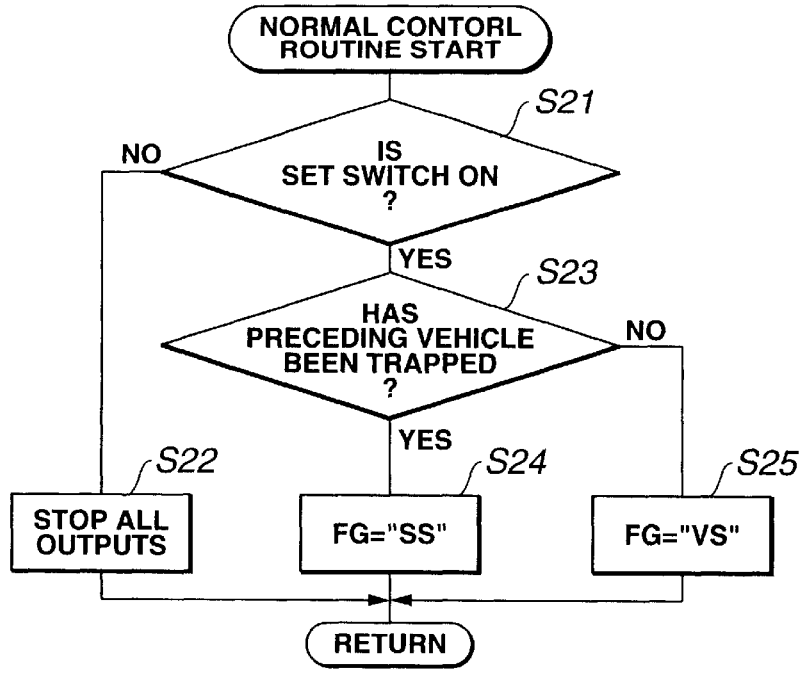
FIG. 4 is an operational flowchart representing a normal control processing routine shown in FIG. 3.

FIG. 4 shows the normal processing routine (as a subroutine) executed at the step S9 shown in FIG. 3.

That is to say, at a step S21, the following controller 20 determines if the set switch 18 is turned on.

If the set switch 18 is turned on (Yes) at the step S21, the routine goes to a step S23.

If the set switch 18 is turned off (No) at the step S21, the following controller 20 ends the following control processing and executes an output stop processing such that the outputs therefrom to the brake controller 8, the engine output controller 9, and the transmission controller 10 are all stopped.

At the step S23, the following controller 20 determines if the preceding vehicle has been trapped by means of the inter-vehicle distance sensor 12.

This determination is carried out by determining if the inter-vehicle distance L detected by the inter-vehicle distance sensor 12 is equal to or shorter than a threshold value $L_{TH}$ representing a detection limit distance.

If $L \leq L_{TH}$ (yes) at the step S23, the following controller 20 determines that the preceding vehicle has been trapped and the routine goes to a step S24. At the step S24, the control state flag FS is set to "SS" representing the inter-vehicle distance control state. If No at the step S23 ($L > L_{TH}$), the routine goes to a step S25.

At the step S25, the control state flag FG is set to "VS" representing the vehicular velocity control state and the routine is ended.

Figure 5:
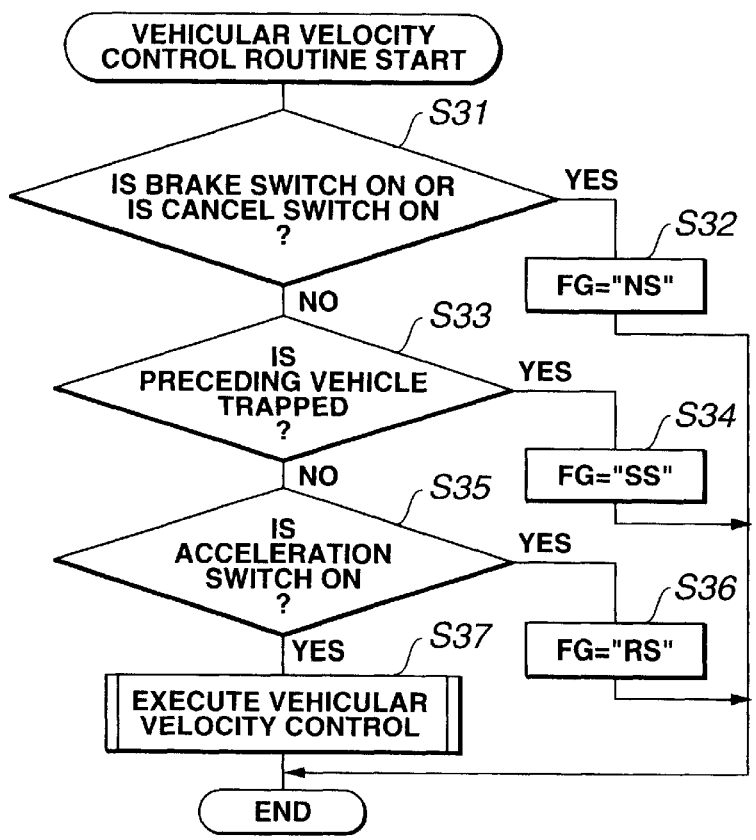
FIG. 5 is an operational flowchart representing a vehicular velocity processing routine shown in FIG. 3.

FIG. 5 shows the inter-vehicle distance control processing routine at the step S4 shown in FIG. 3.

At the step S31 shown in FIG. 5, the following controller 20 determines whether either the brake switch 17 or the cancel switch 19 is turned on.

If neither the brake switch 17 nor the cancel switch 19 is turned on (No) at the step S31, the routine goes to a step S33.

If either the brake switch 17 or the cancel switch 19 is turned on (Yes) at the step S31, the routine goes to a step S32.

At the step S32, the following controller 20 sets the control state flag FG to "NS" representing the normal control state.

At the step S33, the following controller 20 determines if the preceding vehicle has been trapped.

If the vehicular switch 15 is turned on (Yes) at the step S35, the routine goes to a step S36 in which the control state flag FG is set to "RS" representing the temporary release state.

If the accelerator switch 15 is turned off (No) at the step S35, the routine goes to a step S37.

At the step S37, the following controller 20 executes the vehicular velocity control processing.

If the accelerator switch 15 is turned on (Yes) at the step S35, the routine goes to the step S36 in which the control state flag FS is set to "RS" representing the temporary release state and the routine is ended.

It is noted that a vehicular velocity servo system according to a model matching control technique constituted by a model matching compensator and a robust compensator is disclosed in, a U.S. Pat. No. 5,959,572 issued on Sep. 28, 1999 or a generally available feedback control system is applied to the vehicular velocity control processing. Hence, the driving force command value $F_{OR}$ and the disturbance estimated value dv^ to bring the vehicular velocity Vs of the vehicle coincident with a set vehicular velocity $V_{SET}$ to which the vehicular driver has set during the start of the preceding vehicle following control are calculated. The target driving force F* which is the deviation between these values is calculated. The vehicular velocity control to control the brake controller 8, the engine output controller 9, and the transmission controller 10 are controlled in accordance with the target driving force F* (target braking force) to perform the vehicular velocity control.

The vehicular velocity Vs is derived as follow: a measurement value of either an elapsed time between pulses of pulse signals outputted by the wheel velocity sensors 13FL and 13FR or the number of pulses per unit time measured by the pulse signals from the wheel velocity sensors 13FL and 13FR is multiplied by an outer circumference length of each road wheel so as to calculate each road wheel velocity $V_{WL}$ and $V_{WFR}$ and an average value thereof is derived to output its average value as the vehicular velocity Vs.

It is noted that the vehicular velocity Vs may be derived from a detection of an output axle of the automatic transmission 3 or from a pseudo vehicular body velocity used in an anti-skid control system (ABS) mounted in the vehicle.

Figure 6:
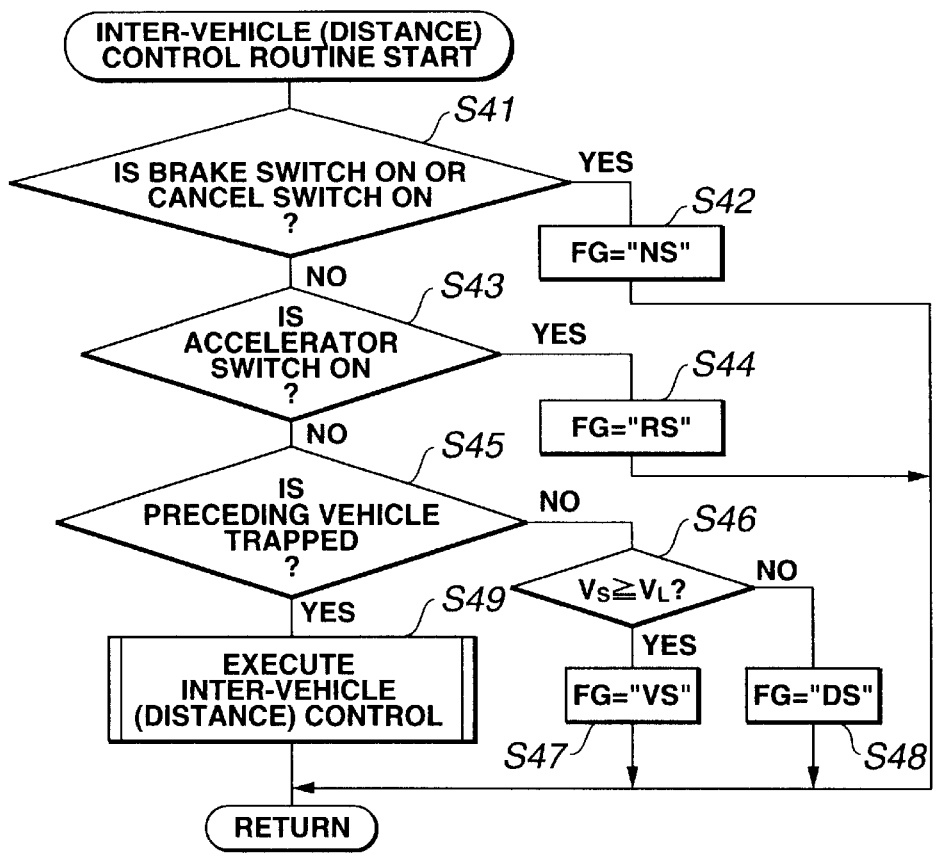
FIG. 6 is an operational flowchart representing an inter-vehicle distance control processing routine shown in FIG. 3.

FIG. 6 shows the inter-vehicle distance processing routine (as a subroutine) at the step S4 shown in FIG. 3.

At a step S41, the following controller 20 determines if either the brake switch 17 or the cancel switch 19 is turned on. If either the brake switch 17 or the cancel switch 19 is turned on at the step S41 (yes), the routine goes to a step S42 in which the control state flag FS is set to "NS" specifying the normal control state and the routine is ended.

If neither the brake switch 17 nor the cancel switch 19 is turned on at the step S41 (No), the routine goes to a step S43. At the step S43, the following controller 20 determines if the accelerator switch 15 is turned on.

If the accelerator switch 15 is turned on (Yes) at the step S43, the present routine goes to a step S44 in which the control state flag FG is set to "RS" specifying the temporary release state and the routine is ended.

At the step S45, the following controller 20 determines if the preceding vehicle has been trapped.

If the preceding vehicle has not been trapped at the step S45 (No) at the step S45, the routine goes to a step S46. At the step S46, the preceding vehicle following controller 20 determines if the vehicular velocity Vs is equal to or longer than the predetermined vehicular value VL representing the upper limit value of the low vehicular velocity region (for example, approximately 5 Km/h). If Vs≦$V_L$ (Yes) at a step S48, the routine goes to a step S47 in which the control state flag FG is set to "VS" representing the vehicular velocity control state. If $V_S$<$V_L$ (No) at the step S46, the routine goes to a step S48 in which the control state flag FG is set to "DS" and the routine is ended. If Yes at the step S46 (Vs≧$V_L$), the routine goes to a step S49. At the step S49, the following controller 20 executes the inter-vehicle distance control and the routine is ended.

In the inter-vehicle distance control, the following controller 20 differentiates the actual inter-vehicle distance L detected by means of the inter-vehicle distance sensor 12 through a band pass filter or a high pass filter to calculate a relative velocity Δ V of the vehicle to the preceding vehicle. Then, the following controller 20 calculates a target inter-vehicle distance L* from the vehicle to the preceding vehicle in accordance with the following equation (1) from a time duration $T_0$ (so-called, an inter-vehicle time duration) for the vehicle to reach to a position an $L_0$ meter behind the preceding vehicle.

$$L^* = Vs \cdot V_0 + Ls \tag{1}$$

In the equation (1), Ls denotes an offset time.

Next, the target inter-vehicle distance L* calculated in accordance with the equation (1) undergoes a low-pass filtering in the form of a second-order lag in accordance with a reference model $G_T(S)$ expressed in the following equation (2) with respect to the target inter-vehicle distance L* to derive an inter-vehicle distance command value $L_T$.

$$G_T(s) = \omega n^2 / \{s^2 + 2\zeta \cdot \omega n \cdot s + \omega n^2\} \tag{2}$$

Next, a target vehicular velocity V* is calculated in accordance with an equation (3) which has used a feedback compensator based on the inter-vehicle distance command value $L_T$.

$$V^* = Vt - \{fd \cdot (L_T - L) + fd \cdot \Delta V\} \tag{3}$$

Next, the vehicular velocity servo system or the generally available feedback system is applied to the calculations of the driving force command value $F_{OR}$ and the external disturbance value dv^ both to make the target vehicular velocity V* substantially equal to the vehicular velocity Vs. The target driving force F* is calculated on the basis of these deviations. The following controller 20 controls the brake controller 20, the engine output controller 9, and the transmission controller 10 in accordance with the target driving force F* so that the vehicular velocity is controlled to make the actual inter-vehicle distance L substantially equal to the target inter-vehicle distance L*.

Figure 7:
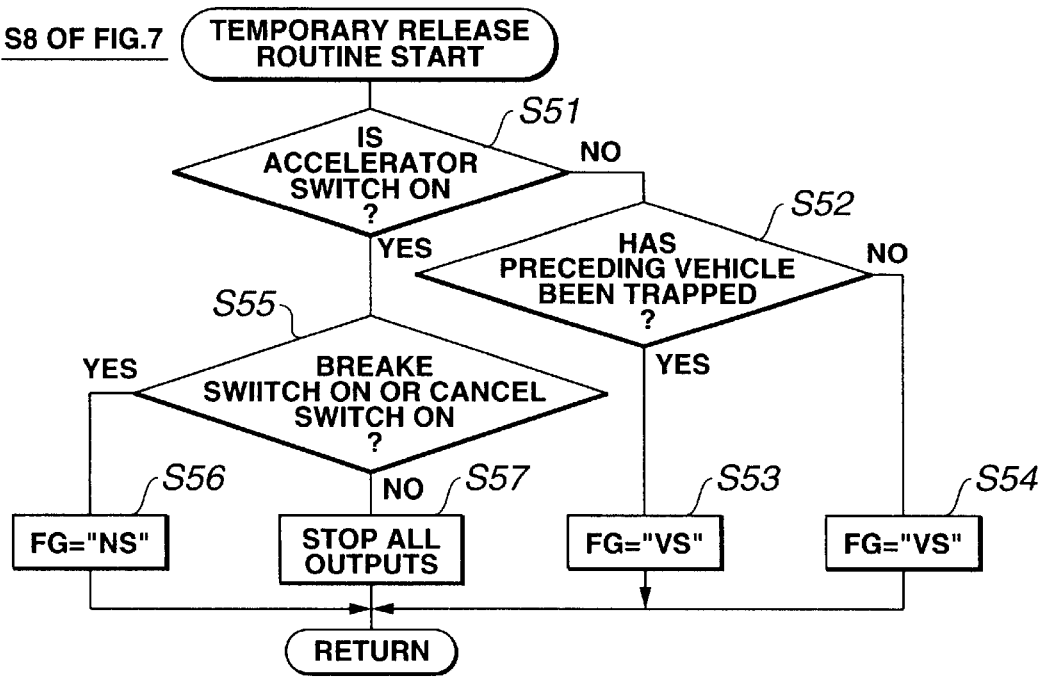
FIG. 7 is an operational flowchart representing a temporary release processing routine shown in FIG. 3.

The temporary release routine is shown in FIG. 7.

At a step S51, the following controller 20 determines whether the accelerator switch 15 is turned off as shown in FIG. 7.

The following controller 20 determines that the accelerator switch 15 is turned off at the step S51 as shown in FIG. 7 (Yes), the following controller 20 determines that the following control should be continued and the routine goes to a step S55.

At the step S55, the following controller 20 determines whether either the brake switch 17 or the cancel switch 19 is turned on. If the following controller 20 determines that the accelerator switch 15 is turned off or determines that the cancel switch 19 is turned off and that the vehicular driver has an intention to continue the following control and the routine goes to a step S52. At the step S52, the following controller 20 determines if the preceding vehicle has been trapped.

If the preceding vehicle has been trapped (Yes) at a step S52, the routine goes to a step S53 in which the control state flag FG is set to "SS" specifying that the inter-vehicle distance state and the routine is ended.

If the preceding vehicle has not been trapped (No) at the step S62, the routine goes to a step S54 in which the control state flag FG is set to "VS" specifying the vehicular velocity control state and the routine is ended.

On the other hand, when the result of determination at the step S51 that the accelerator switch is turned on, the following controller 20 determines that the present state is the deceleration state according to the driver's will and the routine goes to a step S55.

At the step S55, the following controller 20 determines whether either the brake switch 17 or the accelerator switch 15 is turned on, the routine goes to a step S55 in which the control state flag FG is set to "NS" specifying the normal control state and the routine is ended.

If neither the brake switch 17 nor the accelerator switch 15 is turned on (No) at the step S55, the routine goes to a step S57. At the step S57, all outputs to the brake controller 8, the engine output controller 9, and the transmission controller 10 are stopped.

If the preceding vehicle has been trapped (Yes) at the step S52, the following controller 20 sets the control state flag FG to "SS" specifying the inter-vehicle distance control state and the routine is ended.

If no preceding vehicle is trapped, the routine goes to a step S54 in which the control state flag FG is set to "VS" specifying the inter-vehicle distance control state and the routine is ended.

Figure 8:
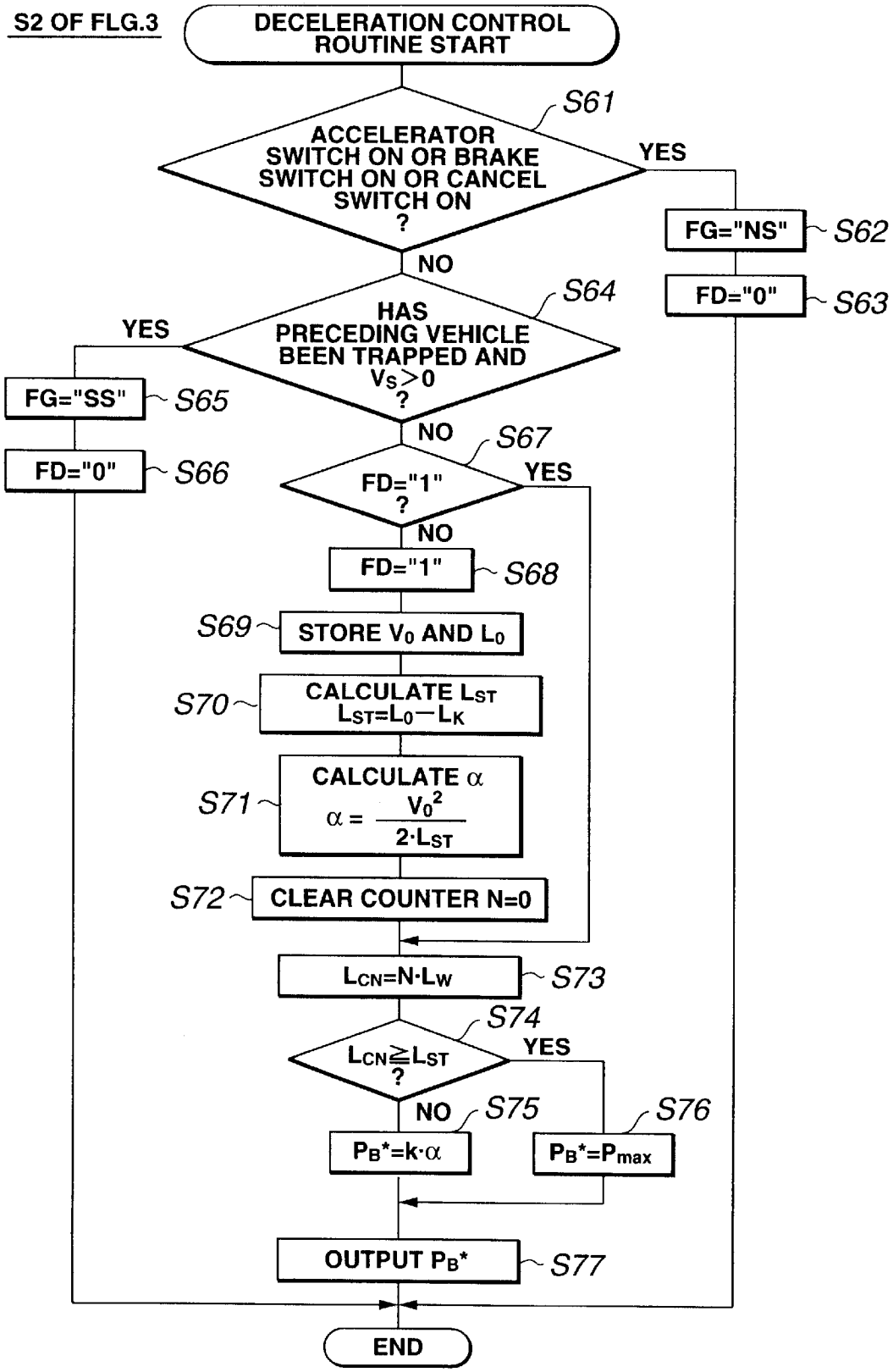
FIG. 8 is an operational flowchart representing a deceleration control processing routine shown in FIG. 3.

Furthermore, FIG. 8 shows the deceleration control routine.

The following controller 20 determines whether any one of the accelerator switch 15, the brake switch 16, and the cancel switch 19 is turned on at a step S61.

If any one of these switches 15, 16, and 19 is turned on (Yes) at a step S61, the routine goes to a step S82.

If all of the accelerator switch 15, the brake switch 16, and the cancel switch are turned off (No) at a step S61, the routine goes to a step S64.

At the step S64, the following controller 20 determines if the preceding vehicle is trapped and Vs>0 (viz., the vehicle is running).

If neither the preceding vehicle is trapped nor Vs>0 (No) at the step S64, the routine goes to a step S67.

At the step S67, the following controller 20 determines if a control release flag FD is set to "1". If the release flag FD is set to "1" (Yes) at the step S67, the routine jumps to a step S73.

If FD≠"1" at the step S67 (No), the routine goes to a step S68. At the step S68, the following controller 20 set the release flag FD to "1".

At the next step S69, the following controller 20 stores the vehicular velocity $V_0$ and the inter-vehicle distance $L_0$.

That is to say, the vehicular velocity Vs(n−1) previously derived and the actual inter-vehicle distance L(n−1) previously derived are stored into a memory area such as the RAM 20b as the stored vehicular velocity $V_0$ and the stored inter-vehicle distance $L_0$ at the time point at which the preceding vehicle is not trapped and the routine goes to a step S70.

At the next step S70, the following controller 20 calculates a target movement distance $L_{ST}$ from a time point at which the preceding vehicle has disappeared to a time point at which the vehicle has stopped using the following equation (4) on the basis of the stored inter-vehicle distance $L_0$.

$$L_{ST}=L_0-Lk \quad (4)$$

In the equation (4), Lk denotes a constant and is set, for example, to 5 meters or so on.

At the next step S71, the following controller 20 calculates a target deceleration a using an equation given as the equation (5) on the basis of a stored vehicular velocity $V_0$ and a target movement distance $L_{ST}$ to derive a target deceleration α.

$$\alpha=V_0^2/2 \cdot L_{ST} \quad (5)$$

This equation (5) means that the vehicle moves and stops by a distance $L_{ST}$ if the vehicle is decelerated at a constant deceleration from an initial vehicular velocity $V_0$.

Next, the routine goes to a step S72 in which a count value N of a distance counter representing a running distance is started upon a time at which the preceding vehicle has disappeared is cleared to "0" and the count value of N is started. The distance counter is constituted by a software counter which is incrementally counted when either one pulse of the road wheel velocity sensors 13FL and 13FR to detect road wheel velocities of the non-driven wheels is outputted.

Next, the routine goes to a step S72.

At the step S72, the following controller 20 clears the distance counter count value N to "0", N representing the count value of the distance counter which represents the running distance at which the preceding vehicle has disappeared and has started.

This distance counter is constituted by the software counter incrementally counted whenever either of the pulses of the wheel velocity sensors 13FL and 13FR is counted to detect the wheel velocities of the non-driven wheels.

Next, at a step S73, the following controller 20 reads the count value N of the distance counter and multiplies an outer peripheral length LW of the road wheel to calculate a running distance $L_{CN}$ (=N·Lw).

Then, the routine goes to a step S74.

At the step S74, the following controller 20 determines whether the calculated running distance $L_{CN}$ calculated at the step S70. If $L_{CN}<L_{ST}$ at a step S75, the routine goes to a step S75, the following equation (6) is calculated to derive the target braking pressure $P_B^*$ and the routine goes to a step S77.

$$P_B^*=K \cdot \alpha \quad (6)$$

In the equation (6), K denotes a constant.

In addition, if the result of determination at a step S74 is $L_{CN}>L_{ST}$, the following controller 20 determines that the calculated running distance $L_{CN}$ is in excess of the target movement distance $L_{ST}$ calculated at the step S70.

IF $L_{CN}<L_{ST}$ at the step S74, the following controller 20 determines that the running distance $L_{CN}$ becomes equal to or exceeded the target movement distance and the routine goes to a step S76. At the step S76, the target braking pressure $P_{MAX}$ is set to the target braking pressure $P_B^*$ and the routine goes to a step S77.

At the step S77, the deceleration control routine is ended, with a target braking pressure $P_B^*$ calculated at a step S75 or S76 outputted to the braking controller 8.

The vehicular velocity control procedure shown in FIG. 5 and the inter-vehicle distance control procedure shown in FIG. 6 correspond to following controlling means.

The steps S45, S46, and S46 in the inter-vehicle distance control procedure and the deceleration control procedure shown in FIG. 8 corresponds to deceleration stopping means.

Suppose, now, that the set switch 18 is turned off and the vehicle is running in the normal control state with the following control released.

In this state, since the control state flag FG is set to "NS" the main routine shown in FIG. 3 goes to the step S9 via the steps S1, S5, and S7 and the normal control processing routine shown in FIG. 4 is executed.

If the set switch 18 is turned off, the routine goes from the step S21 shown in FIG. 4 to the step S22. At the step S24, all of the output signals to the brake controller 8, the engine output controller 9, and the transmission controller 10 are stopped with the following control continued to be released.

Suppose that, in the above-described normal control state, the set switch 18 is turned on to set the set vehicular velocity $V_{SET}$. During the execution of the normal control state procedure shown in FIG. 4, the routine goes from the step S21 to the step S23. If the inter-vehicle distance sensor 12 has trapped the preceding vehicle, the routine goes from the step S23 to the step S24 in which the control state flag FG is set to "SS".

Therefore, when the main routine of the following control procedure shown in FIG. 3 is executed, the routine goes from the step S3 to the step S24 in which the inter-vehicle distance control processing routine shown in FIG. 6 is executed.

Since each of the brake switch 17, the cancel switch 19, and the accelerator switch 15 is turned off and the preceding vehicle is trapped, the routine goes to the step S49 in which the subroutine of the inter-vehicle (distance) control procedure shown in FIG. 6 is executed.

At the step S49, the following controller 20 calculates the relative velocity ΔV to the preceding vehicle on the basis of the actual inter-vehicle distance L detected by means of the inter-vehicle distance sensor 12, calculates the target inter-vehicle distance L* on the basis of the relative velocity ΔV, the vehicular velocity Vs of the vehicle, and the inter-vehicle time duration To, calculates the target vehicular velocity V* on the basis of the target inter-vehicle distance L*, calculates the target driving force F* (the target driving force includes the target braking force since a negative value of the target driving force means the target braking force), and manages the brake controller 8, the engine output controller 9, and the transmission controller 10 on the basis of the target driving force F* to perform the vehicular velocity control in such a manner that the actual inter-vehicle distance L is made substantially equal to the target inter-vehicle distance L*. Then, the above-described inter-vehicle (distance) control is executed.

In the above-described inter-vehicle distance control, either the brake switch 17 or the cancel switch 19 is turned on, the routine shown in FIG. 6 goes from the step S41 to the step S42.

Since the control state flag FG is set to "NS", the normal control procedure shown in FIG. 4 is executed when the procedure shown in FIG. 3 is executed at the next interval of time. Then, the following control state is released and the control state is returned to the normal control state.

In addition, when the accelerator pedal 14 is depressed according to the vehicular driver's will under the inter-vehicle distance control state, the routine shown in FIG. 6 goes from the step S43 to the step S44. At the step S44, the control state flag FG is set to "RS". Next, when the main routine of FIG. 3 is executed, the temporary release procedure shown in FIG. 7 is executed. When, in the temporary release state, the acceleration state is ended with the depression of the accelerator pedal 14 released, the routine shown in FIG. 7 goes from the step S51 to the step S52 since the accelerator switch 15 is turned off.

If, then, the preceding vehicle has been trapped, the control state of the temporary release state is returned to the inter-vehicle distance control state. If not trapped at the step S54, the control state flag FG is set to "VS". When the main routine shown in FIG. 3 is executed at the next interval of execution time, the vehicular velocity in FIG. 3 is executed.

In the vehicular velocity control processing routine, the following controller 20 sets the target acceleration to make the vehicular velocity Vs substantially equal to the set vehicular velocity $V_{SET}$ which is set by the vehicular driver.

The opening angle θ to be outputted to the engine output controller 9 is controlled in accordance with the target acceleration (the target acceleration includes the target deceleration since a negative value of the target acceleration indicates the target deceleration). When the vehicle is running on a descending slope, an engine braking control caused by the down-shift control through the transmission controller 10 and/or the brake controller 8.

When, in the vehicular velocity control, either the brake switch 17 or the cancel switch 19 is turned on, the control state flag FG is set to "NS", the following control is released and the control state is returned to the normal control state. If the preceding vehicle is trapped, the control state flag FG is set to "SS" and the processing enters into the inter-vehicle (distance) control state.

If the accelerator switch 15 is turned on, the control state flag FG is set to "RS" to fall into the temporary release state.

Furthermore, in the inter-vehicle (distance) control state, if the preceding vehicle has disappeared from the detection zone of the inter-vehicle distance sensor 12 and the vehicular velocity Vs falls in the normal running vehicular velocity region which is equal to or higher than the preset vehicular velocity $V_L$ representing the upper limit value of the low velocity region, the routine shown in FIG. 6 goes from the step S45 to the step S46 and goes to the step S47. If the control state flag FG is set to "VS", the control state is transferred to the vehicular velocity control state.

However, in the low vehicular velocity region in which the vehicular velocity is lower than the present vehicular velocity $V_L$, the routine shown in FIG. 6 goes from the step S46 to the step S48 in which the control state flag FG is set to "DS" and the deceleration control procedure shown in FIG. 8 is executed in the routine shown in FIG. 3.

At this time, since all of the accelerator switch 15, the brake switch 17, and the cancel switch 19 are turned off, the routine goes from the step S61 to the step S64.

Since the preceding vehicle is not trapped and the vehicle is running at the low velocity region, the routine goes to the step S68 in which the deceleration control state flag FD is set to "1" and both the vehicular velocity $V_0$ and the inter-vehicle distance $L_0$ which are immediately before the preceding vehicle has disappeared from the detection zone are read. Then, the following controller 20 calculates the target movement distance $L_{ST}$ to make the vehicle stop on the basis of the inter-vehicle distance $L_0$, calculates the target deceleration a using the equation (4) on the basis of the target movement distance $L_{ST}$ and the vehicular velocity $V_0$, clears the count value of the distance counter to "0" to start the count of pulses from the vehicular velocity sensors 13FL and 13FR.

Since, at this time point, it is an immediate after the deceleration control is started, the running distance $L_{CN}$ maintains zero and is shorter than the target movement distance $L_{ST}$. Hence, the routine goes from the step S74 to the step S75. At the step S75, the following controller 20 calculates the target braking pressure $P_B^*$ by multiplying the target deceleration a with the constant K, this being outputted to the brake controller 8 so that the braking pressure of each disc plate 7 is controlled so that the vehicle is decelerated at the target deceleration α.

Thereafter, when the off state of the accelerator switch 15, the brake switch 17, and the cancel switch 19 is continued and the state at which no preceding vehicle is trapped is continued, the routine goes from the step S67 to the step S73. Since, at this time, the vehicle is decelerated, the running distance $L_{CN}$ is increased. While the running distance $L_{CN}$ maintains at a distance shorter than the target movement distance $L_{ST}$, the deceleration state at which the target deceleration α is maintained is continued. When the vehicle is immediately before the complete stop and the running distance $L_{CN}$ by which the vehicle was running indicates being equal to or in excess of the target movement distance $L_{ST}$, the routine from the step S74 to the step S76 in which the target braking pressure $P_B^*$ is set to the maximum braking pressure $P_B^*$ is set to the maximum braking pressure $P_{MAX}$. Accordingly, a maximum braking force is developed across each disc brake 7 and the vehicle stops.

Then, suppose that, when the vehicle stops and the vehicular driver depresses the accelerator pedal 14 to be in the acceleration state, the routine shown in FIG. 6 goes from the step S61 to the step S62 in which the control state flag FG is set to "NS". Then, the deceleration control state flag FD is reset to "0" so that the control state is returned to the normal control state.

On the other hand, if the vehicle is decelerated and the preceding vehicle is trapped, the routine shown in FIG. 6 goes from the step S64 to the step S65 in which the control state flag FG is set to "1" but the deceleration control state flag FD is reset to "0" and the inter-vehicle distance (distance) control is resumed.

As described above, when, in the first embodiment of the preceding vehicle following controlling apparatus, in the inter-vehicle (distance) control state such that the vehicular velocity is controlled to make the actual inter-vehicle distance L coincident with the target inter-vehicle distance $L^*$ with the preceding vehicle trapped, the inter-vehicle distance sensor 12 cannot detect the preceding vehicle due to any cause and the vehicular velocity Vs falls in a normal running vehicular velocity range which is equal to or higher than the preset vehicular velocity $V_L$ representing the upper limit value of the low vehicular velocity range, the following controller 20 performs the vehicular velocity control to make the vehicular velocity Vs substantially equal to the set vehicular velocity $V_{SET}$ set by the vehicular driver. However, if the vehicular velocity Vs falls within the low vehicular velocity region which is lower than the preset vehicular velocity $V_L$, the following controller 20 calculates the target movement distance $L_{ST}$ on the basis of the vehicular velocity $V_0$ and the inter-vehicle distance $L_0$ immediately before the preceding vehicle has disappeared from the detection zone of the inter-vehicle distance sensor 12, calculates the target deceleration α on the basis of the stored target movement distance $L_{ST}$ and the stored vehicular velocity $V_0$, stops the vehicle after the deceleration state such as to maintain the target deceleration a. Consequently, the vehicle can positively be prevented from being accelerated when the preceding vehicle is not trapped and in a case where the inter-vehicle distance sensor 12 cannot trap the preceding vehicle by means of the inter-vehicle distance sensor 12 due to some cause but the so-called preceding vehicle is present, the mismatch to the vehicular driver's sense of vehicular driving can positively be prevented, and so-called fail safe function can be exhibited.

Although, in the first embodiment, the number of pulses in the pulse train signal of the wheel velocity sensors 13FL and 13FR are counted in the acceleration control procedure shown in FIG. 8 and the counted number of pulses is multiplied by the road wheel outer circumference length to derive the running distance $L_{CN}$. However, alternatively, a counted number of a vehicular odometer may be used as the running distance or the running distance may be calculated on the basis of an elapsed time between the respective pulses of the pulse signal and the vehicular velocity.

It is noted that, in the first embodiment, the target inter-vehicle distance $L^*$ is calculated on the basis of the vehicular velocity Vs. However, in the inter-vehicle distance L may be differentiated through a band-pass filtering or a high-pass filtering to calculate a relative velocity ΔV, the relative velocity ΔV may be added to the vehicular velocity Vs to calculate a vehicular velocity of the preceding vehicle Vt, and, then, the target inter-vehicle distance $L^*$ may be calculated on the basis of the vehicular velocity Vt of the preceding vehicle.

It is also noted that, in the first embodiment, the laser radar is applied to the inter-vehicle distance detecting means (the inter-vehicle distance sensor 12). However, the inter-vehicle distance may be calculated using a millimeter wave radar, or alternatively using an image processing of an image photographed by a stereoscopic camera.

It is also noted that although, in the first embodiment, the vehicular velocity is calculated from the wheel velocities of the front road wheels, viz., the non-driven wheels, a vehicular body velocity may be estimated from four wheel velocities including the driven wheels (rear road wheels 1RR and 1RL). Furthermore, a revolution velocity on an output axle of the automatic transmission 3 may be used to measure the vehicular velocity.

(Second Embodiment)

Figure 9:
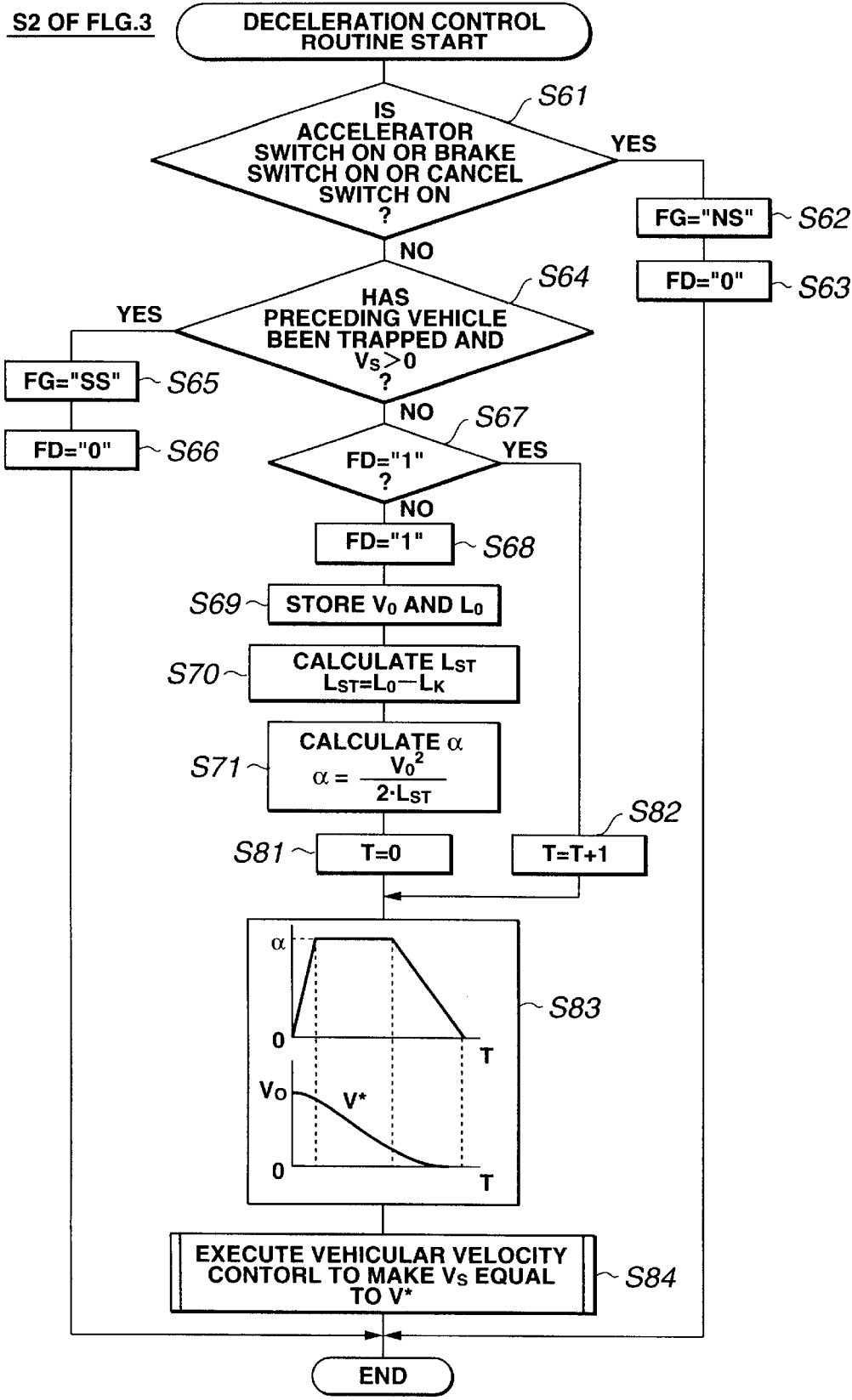
FIG. 9 is an operational flowchart representing the deceleration control processing routine executed in the following controller of the preceding vehicle following control apparatus in a second preferred embodiment according to the present invention.

FIG. 9 shows another deceleration control processing routine executed at the step S2 of the main routine shown in FIG. 3 in place of FIG. 8 as a second preferred embodiment of the preceding vehicle following control apparatus according to the present invention.

In the second embodiment, the deceleration control procedure to be executed when the preceding vehicle cannot be detected by means of the inter-vehicle distance sensor 12 provides smooth vehicular velocity variations when the deceleration start occurs and when the vehicle is about to stop in place of providing the vehicular deceleration at the constant deceleration.

In details, in the second embodiment, the deceleration control processing routine shown in FIG. 9 eliminates the step S72 through S77 shown in FIG. 8 described in the first embodiment but stops S81 through S84 are inserted in place of the eliminated steps S72 through S77 shown in FIG. 8. The other steps are the same as those described in FIG. 8. Then, the detailed description of the same numbered steps will herein be omitted.

At the step S81, the following controller 20 clears the count value T to zero ("0") of a timer counter measuring an elapsed time from a time point at which the deceleration is started.

Then, the routine in FIG. 9 goes to the step S83.

In addition, if the result of the deceleration control flag FD is "1" (Yes) at the step S67, the routine goes to the step S82. At the step S82, the count value T of the time counter is incremented by one (T=T+1) and the routine goes to the step S83.

At the step S83, the following controller 20 increases negatively the deceleration at a relatively large gradient on the basis of the target deceleration α calculated at the step S71 described above when the deceleration start occurs, maintains the deceleration which equals the target deceleration α and calculates a target deceleration profile shown at an upper part of the step S83 such that the deceleration is reduced at a small gradient as compared with the occurrence of the deceleration start.

On the basis of the calculated target deceleration profile according to the elapsed time T as shown at a lower part of the step S83 such that the vehicular velocity is reduced at a relatively moderate vehicular velocity decrease state when the deceleration start occurs and, thereafter, the relatively steep vehicular velocity decreasing state occurs according to the target deceleration α occurs. Then, the target vehicular velocity V* in accordance with the elapsed time T is set and the routine goes to the step S84.

Figure 10:
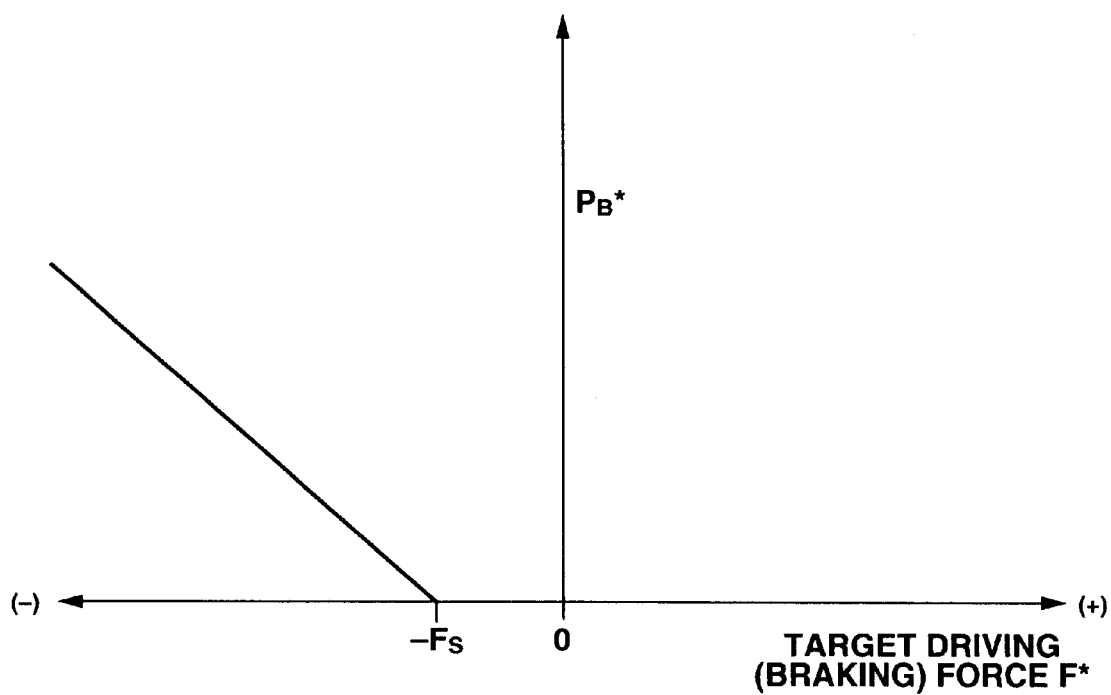
FIG. 10 is a characteristic graph representing a relationship between a target driving (baking) force and a target braking pressure.

At the step S84, the following controller 20 calculates the target driving force F* on the basis of the target vehicular velocity V* set by the model matching compensator and the robust compensator in the same way as the inter-vehicle (distance) control procedure described above, calculates the target braking pressure $P_B^*$ by referring to a control map, for example, shown in FIG. 10 on the basis of the target driving force F*, and outputs the target braking pressure $P_B^*$ to the braking controller 8 to perform the deceleration control. Then, the deceleration control procedure is ended and the routine is returned to the main routine shown in FIG. 3.

It is noted that the processing routine shown in FIG. 9 corresponds to the deceleration controlling means, the step S83 corresponds to the target vehicular velocity calculating means, and the step S83 corresponds to the vehicular velocity controlling means.

In the second embodiment described above, the deceleration control procedure shown in FIG. 9 is executed when the preceding vehicle is trapped, in the inter-vehicle (distance) control state to follow the preceding vehicle cannot be trapped due to some cause, and the vehicular velocity Vs falls in a low vehicular velocity range lower than the preset vehicular velocity $V_L$.

Since the deceleration control state flag FD is reset to "0" during the deceleration control start, an initialization processing of the step S67 and the steps S68 through S71 is performed to calculate the target deceleration α. At the step S81, the count value T of the elapsed time counter is reset to "0" and the routine goes to the step S83.

Therefore, although the deceleration of the deceleration profile during the start of the deceleration control indicates zero ("0") so that the target vehicular velocity V* is maintained at the vehicular velocity V0, the count value T of the elapsed time counter is reset to "0" and the routine goes to the step S83.

Therefore, although the target vehicular velocity V* is maintained at the vehicular velocity $V_0$ when the deceleration of the deceleration velocity profile during the deceleration control start indicates zero, the count value T of the elapsed time counter is incrementally counted at the next timer interrupted period.

Hence, the deceleration is increased and the target vehicular velocity V* is moderately decreased, and the target braking pressure $P_B^*$ which is relatively small is set. Thus, each disc brake 7 is controlled by means of the brake controller 8 to develop the braking force.

Thereafter, when the deceleration reaches to the target deceleration α, the target vehicular velocity V* is decreased at the constant deceleration and the vehicular velocity Vs is decreased to make the vehicular velocity Vs substantially equal to the target vehicular velocity V* and the vehicular deceleration starts to be decreased in accordance with the deceleration profile when the vehicle is about to stop. At this time, the decreasing rate of the target vehicular velocity V* is gradually reduced, the braking force developed across each disc brake 7 is gradually decreased, and the vehicle is smoothly stopped.

In the second embodiment, when the preceding vehicle is not trapped in a state wherein the vehicular velocity Vs falls in the low vehicular velocity region, the deceleration control is performed which accords with the vehicular driver's braking operation. Consequently, no mismatch to the vehicular driver's sense of the vehicular driving can occur.

(Third Embodiment)

Figure 11:
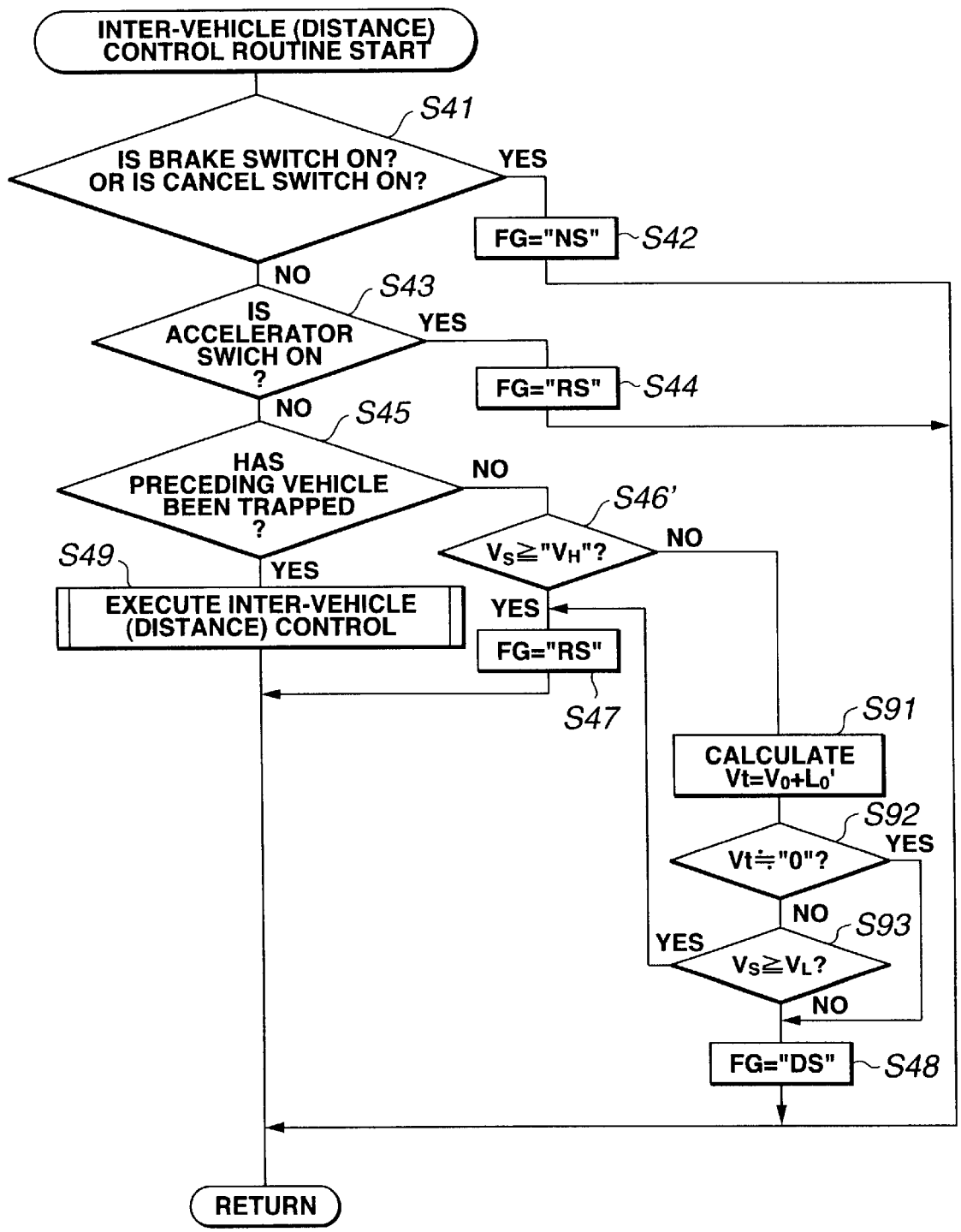
FIG. 11 is an operational flowchart representing the inter-vehicle distance control processing routine executed in the following controller of the preceding vehicle following control apparatus in a third preferred embodiment according to the present invention.

FIG. 11 shows the inter-vehicle (distance) control processing routine executed in a third preferred embodiment of the preceding vehicle following control apparatus according to the present invention. In the third embodiment, the following controller 20 carries out the deceleration control when the preceding vehicle substantially stops even in a case where, when the preceding vehicle is not trapped, the vehicular velocity Vs falls in the vehicular velocity range slightly higher than the preset vehicular velocity $V_L$.

That is to say, in the third embodiment, the following controller 20 determines whether the vehicular velocity Vs is equal to or higher than another preset vehicular velocity $V_H$ (for example, approximately 10 km/h) which is slightly higher than the preset vehicular velocity $V_L$ described in each of the first and second embodiments at a step S46' shown in FIG. 11 as is different from the step S46 shown in FIG. 6 described in the first embodiment. If Vs $V_H$ (Yes) at the step S46', the routine goes to the step S47 described with reference to FIG. 6. However, if Vs<$V_H$ (No) at the step S46', the routine goes to a step S91. At the step S91, the following controller 20 adds a differential value of L0' on the inter-vehicle distance L0 to the vehicular velocity $V_0$ immediately before the preceding vehicle is not trapped to derive a vehicular velocity Vt of the preceding vehicle (Vt=$V_0$+ $L^{0'}$). At the next step S92, the following controller 20 determines that the vehicular velocity Vt (=$V_0$+$L_0'$) of the preceding vehicle indicates approximately zero. If Vt≈0 (Yes) at the step S92, the following controller 20 determines that the preceding vehicle has approximately stopped and the routine goes to the step S48 in which the control state flag FG is set to "DS" representing the deceleration control state and the routine is ended. If the vehicular velocity of the preceding vehicle Vt is not approximately equal to zero (No) at the step S92, the routine goes to a step S93 in which the following controller 20 determines if the vehicular velocity Vs is equal to or higher than a preset vehicular velocity $V_L$.

If Vs≧$V_L$ (Yes) at the step S93, the routine goes to the step S47. If Vs<$V_L$ (No) at the step S93, the routine goes to the step S48.

In the processing routine shown in FIG. 11, the steps S45, S46, and S48 and the steps S91 through S93, and the steps shown in FIG. 8 or 9 correspond to the vehicular velocity controlling means. The content of the step S91 corresponds to preceding vehicle vehicular velocity estimating means.

In the third embodiment, when the vehicular velocity Vs is equal to or higher than the other preset vehicular velocity $V_H$ which is slightly higher than the preset vehicular velocity $V_L$ in the first embodiment and, in this state, the preceding vehicle is not trapped, the vehicular velocity control processing shown in FIG. 5 is executed so that the vehicle is accelerated up to the set vehicular velocity $V_{SET}$ set by the vehicular driver. When the vehicular velocity Vs is lower than the preset vehicular velocity VH and the vehicular velocity Vt of the preceding vehicle is estimated to be approximately zero so that the vehicle approximately stops. At this time, the deceleration processing shown in FIG. 8 or FIG. 9 is executed and the vehicle is decelerated and stopped.

If the vehicular velocity Vs falls in $V_L$≦Vs<$V_H$ and the vehicular velocity Vt of the preceding vehicle is in the running state not indicating approximately zero, the inter-vehicle (distance) control shown in FIG. 5 is executed. If the vehicular velocity Vs becomes lower than the preset vehicular velocity $V_L$, the deceleration control shown in FIG. 8 or 9 is executed irrespective of the vehicular velocity Vt of the preceding vehicle.

Hence, in a state wherein the vehicular velocity Vs falls in the low vehicular velocity region which is higher than the present vehicular velocity $V_L$ described in either the first or second embodiment but is lower than the other preset vehicular velocity $V_H$ and the preceding vehicle is approximately stopped, the deceleration control is executed so that the vehicle stops without a quick narrowing of the inter-vehicle distance. Hence, an opportunity for the control state to be transferred into the deceleration control state is increased so that the number of times (a frequency) by which the mismatch to the vehicular driver's sense of vehicular driving occurs can be reduced.

In addition, when the vehicular velocity Vs falls in a vehicular velocity region between the preset vehicular velocity $V_H$ and the other preset vehicular velocity $V_L$, the vehicular deceleration is carried out only when the preceding vehicle is in the acceleration state, the vehicle immediately becomes vehicular velocity control state and becomes accelerated so that an optimum vehicular behavior can be achieved in accordance with a behavior of the preceding vehicle.

It is noted that, in the third embodiment, the vehicular velocity $V_O$ and the differential value of $L_O'$ of the inter-vehicle distance.

However, since, as described in the first embodiment, the relative velocity $\Delta V$ of the vehicle to the preceding vehicle is calculated in the inter-vehicle (distance) control procedure, the vehicular velocity Vt of the preceding vehicle may be calculated by adding the vehicular velocity Vs to the relative velocity $\Delta V$.

It is also noted that, in each of the first, second, and third embodiments, in the inter-vehicle (distance) control procedure at the step S49 shown in FIG. 6 or FIG. 11, the target vehicular velocity V* is calculated on the basis of the deviation between the target inter-vehicle distance L* and the actual inter-vehicle distance L in order to perform the vehicular velocity control in such a manner that the vehicular velocity Vs is made substantially equal to the target vehicular velocity V*. However, the target acceleration may be calculated on the basis of the deviation between the target inter-vehicle distance L* and the actual inter-vehicle distance L, and on the basis of which the following controller 20 may control the brake controller 8, the engine output controller 9, and the automatic transmission controller 10.

In each of the first, second, and third embodiments, the wheel velocity sensors 13FL and 13FR are applied as vehicular velocity detecting means. However, the four wheel velocities of the front left and right road wheels may be detected, may be based on an estimation of a vehicular body velocity which corresponds to the vehicular velocity. Or alternatively, the vehicular velocity may be detected by the detection of a revolution speed of an output shaft of the automatic transmission 3.

Furthermore, in each of the first, second, and third embodiments, the automatic transmission 3 is applicable to an output shaft of the engine 2. However, a continuously variable transmission (CVT) may be applied to the output shaft of the engine 2.

In each embodiment, the present invention is applicable to he rear-wheel driven vehicle (as shown in FIG. 1A). However, the present invention is applicable to a front-wheel drive vehicle or to a four-wheel drive (4WD) vehicle. Furthermore, the present invention is applicable to an electric vehicle in which an electric motor is applied in place of the engine 2 or a hybrid vehicle in which the engine 2 and the electric motor are used together as the prime mover. In these application cases of the electric vehicle and the hybrid vehicle, an electric motor controller may be applied in place of the engine output controller or together with the engine output controller.

It is noted that a vehicular velocity controller described in the claims corresponds to the following controller 20 described in each embodiment.

It is also noted that a predetermined velocity value corresponds to the preset vehicular velocity $V_L$, another predetermined velocity value corresponds to the other present vehicular velocity $V_H$, and $V_L<V_H$.

The entire contents of a Japanese Patent Application No. Heisei 11-186496 (filed in Japan on Jun. 30, 1999) are herein incorporated by reference. Although the invention has been described above by reference to certain embodiment of the invention, the invention is not limited to the embodiments described above. Modifications and variations of the embodiments described above will occur to those skilled in the art in the light of the above teachings. The scope of the invention is defined with reference to the following claims.

What is claimed is:

1. A preceding vehicle following control apparatus for an automotive vehicle, comprising:

a vehicular velocity detector to detect a vehicular velocity of the vehicle;

an inter-vehicle distance detector to trap a presence of a preceding vehicle which is running ahead of the vehicle and to detect an inter-vehicle distance from the vehicle to the trapped preceding vehicle;

a driving force controller to control a driving force transmitted from a prime mover to a road wheel axle;

a brake controller to control a braking force applied to road wheels of the vehicle; and a vehicular velocity controller including a target inter-vehicle distance calculating section that calculates a target inter-vehicle distance on the basis of the vehicular velocity detected by the vehicular velocity detector and the inter-vehicle distance detected by the inter-vehicle distance detector, a first vehicular velocity controlling section that performs a vehicular velocity control such that the vehicle follows up the preceding vehicle maintaining the inter-vehicle distance at the target inter-vehicle distance through at least one of the driving force controller and the brake controller to bring the detected inter-vehicle distance substantially coincident with the target inter-vehicle distance, and a vehicular deceleration stopping section that performs a vehicular deceleration control to stop the vehicle in accordance with the inter-vehicle distance from the vehicle to the preceding vehicle immediately before a time point at which the inter-vehicle distance detector which trapped the presence of the preceding vehicle has not detected the preceding vehicle when the vehicular velocity detected by the vehicular velocity detector falls in a low vehicular velocity region lower than a predetermined velocity value and the inter-vehicle distance detector which trapped the presence of the preceding vehicle has not detected the preceding vehicle.

2. A preceding vehicle following control apparatus for an automotive vehicle as claimed in claim 1, wherein the vehicular deceleration stopping section includes: a target movement distance setting section that sets a target movement distance of the vehicle on the basis of the inter-vehicle distance from the vehicle to the preceding vehicle immediately before the time point at which the inter-vehicle distance detector which trapped the presence of the preceding vehicle has not detected the preceding vehicle and the vehicular velocity of the vehicle; a target vehicular velocity calculating section that calculates a target vehicular velocity which takes a vehicular velocity trajectory such that the vehicle stops after the vehicle has moved by the target movement distance; and a second vehicular velocity controlling section that performs the vehicular velocity control through at least one of the driving force controller and the brake controller to bring the vehicular velocity of the vehicle substantially coincident with the target vehicular velocity when the vehicular velocity detected by the vehicular velocity detector falls in the low vehicular velocity region lower than the predetermined velocity value.

3. A preceding vehicle following control apparatus for an automotive vehicle as claimed in claim 1, wherein the vehicular deceleration stopping section includes: a preceding vehicle vehicular velocity estimating section that estimates a vehicular velocity of the preceding vehicle; a target movement distance setting section that sets a target movement distance of the vehicle on the basis of both of the inter-vehicle distance from the vehicle to the preceding vehicle immediately before the time point at which the inter-vehicle distance detector which trapped the presence of the preceding vehicle has not detected the preceding vehicle and the vehicular velocity of the vehicle; a target vehicular velocity calculating section that calculates a target vehicular velocity which takes a vehicular velocity trajectory such that the vehicle stops after the vehicle has moved by the target movement distance when the vehicular velocity of the preceding vehicle is approximately zero and when the vehicular velocity detected by the vehicular velocity detector falls in the low velocity region lower than the predetermined velocity value and the preceding vehicle is not detected by the inter-vehicle distance detector.

4. A preceding vehicle following control apparatus for an automotive vehicle as claimed in claim 3, wherein the preceding vehicle vehicular velocity estimating section estimates the vehicular velocity of the preceding vehicle by adding a differentiated value of the inter-vehicle distance to the vehicular velocity immediately before the time point at which the preceding vehicle is not detected by the inter-vehicle distance detector.

5. A preceding vehicle following control apparatus for an automotive vehicle as claimed in claim 2, wherein the target movement distance setting section sets the target movement distance $L_{ST}$ of the vehicle as follows: $L_{ST}=L_0-L_K$, wherein $L_0$ denotes a stored inter-vehicle distance which is stored into a first memory area of the inter-vehicle distance at the time point when the inter-vehicle distance detected which trapped the presence of the preceding vehicle has not trapped the preceding vehicle and which corresponds to a previously detected inter-vehicle distance $L(n-1)$ and Lk denotes a constant.

6. A preceding vehicle following control apparatus for an automotive vehicle as claimed in claim 5, wherein the target vehicular velocity calculating section includes a target deceleration α as follows: $α=V_0^2/2·L_{ST}$, wherein $V_0$ denotes a stored vehicular velocity which is stored into a second memory area of the vehicular velocity of the vehicle at the time point when the inter-vehicle distance detector which trapped the presence of the preceding vehicle has not trapped the preceding vehicle and which corresponds to a previously detected vehicular velocity of the vehicle.

7. A preceding vehicle following control apparatus for an automotive vehicle as claimed in claim 6, further comprising a running distance detector in response to the calculation of the target movement distance calculator to detect whether a running distance $L_{CN}$ of the vehicle indicates the target movement distance $L_{ST}$ and wherein the second vehicular velocity controlling section outputs a target braking pressure $P_B^*$ as follow: $P_B^*=K·α$, wherein K denotes a constant when $L_{CN}<L_{ST}$ and outputs the target braking pressure $P_B^*$ which corresponds to a maximum braking force $P_{MAX}$ to the brake controller.

8. A preceding vehicle following control apparatus for an automotive vehicle as claimed in claim 6, wherein the target vehicular velocity calculating section calculates the target deceleration α such that the deceleration having a large gradient which exceeds a predetermined gradient when the deceleration control is started occurs, when the deceleration reaches to the target deceleration α, the deceleration equal to the target deceleration α is continued for a predetermined time duration and, thereafter, the deceleration having a small gradient which is smaller than the predetermined gradient occurs, and sets the target vehicular velocity V* in accordance with an elapsed time T from the time at which the inter-vehicle distance detector which trapped the presence of the preceding vehicle has not detected the preceding vehicle and in accordance with the target deceleration α.

9. A preceding vehicle following control apparatus for an automotive vehicle as claimed in claim 4, further comprising a first comparator to compare the vehicular velocity Vs with another predetermined velocity value $V_H$ which is higher than the predetermined velocity value $V_L$ when the inter-vehicle distance detector which trapped the presence of the preceding vehicle has not detected the preceding vehicle to determine whether the vehicular velocity falls in another the low vehicular velocity range lower than the other predetermined velocity value and a second comparator to compare the vehicular velocity Vt of the preceding vehicle with zero to determine whether the vehicular velocity Vt of the preceding vehicle indicates approximately zero when the first comparator determines that $Vs<V_H$ and wherein the target vehicular velocity calculating section calculates the target vehicular velocity V* when the second comparator determines that Vt≈0 and the vehicular velocity Vs of the vehicle falls in the low vehicular velocity range lower than the predetermined velocity value.

10. A preceding vehicle following control apparatus for an automotive vehicle, comprising:

vehicular velocity detecting means for detecting a vehicular velocity of the vehicle;

inter-vehicle distance detecting means for trapping a presence of a preceding vehicle which is running ahead of the vehicle and detecting an inter-vehicle distance from the vehicle to the trapped preceding vehicle;

driving force controlling means for controlling a driving force transmitted from a prime mover to a road wheel axle;

brake controlling means for controlling a braking force applied to road wheels of the vehicle; and vehicular velocity controlling means including a target inter-vehicle distance calculating means for calculating a target inter-vehicle distance on the basis of the vehicular velocity detected by the vehicular velocity detecting means and the inter-vehicle distance detected by the inter-vehicle distance detecting means, first vehicular velocity controlling means for performing a vehicular velocity control such that the vehicle follows up the preceding vehicle maintaining the inter-vehicle distance at the target inter-vehicle distance through at least one of the driving force controlling means and the brake controlling means to bring the detected inter-vehicle distance substantially coincident with the target inter-vehicle distance, and vehicular deceleration stopping means for performing a vehicular deceleration control in accordance with the inter-vehicle distance from the vehicle to the preceding vehicle immediately before a time point at which the inter-vehicle distance detecting means which trapped the presence of the preceding vehicle has not detected the preceding vehicle to stop the vehicle when the vehicular velocity detected by the vehicular velocity detecting means falls in a low vehicular velocity region lower than a predetermined velocity value and the inter-vehicle distance detecting means which trapped the presence of the preceding vehicle has not detected the preceding vehicle.

11. A preceding vehicle following control method for an automotive vehicle, comprising:

detecting a vehicular velocity of the vehicle;

trapping a presence of a preceding vehicle which is running ahead of the vehicle and to detect an inter-vehicle distance from the vehicle to the trapped preceding vehicle;

controlling a driving force transmitted from a prime mover to a road wheel axle;

controlling a braking force applied to road wheels of the vehicle;

calculating a target inter-vehicle distance on the basis of the detected vehicular velocity and the detected inter-vehicle distance;

performing a vehicular velocity control such that the vehicle follows up the preceding vehicle maintaining the inter-vehicle distance at the target inter-vehicle distance through controlling at least one of the driving force and the braking force to bring the detected inter-vehicle distance substantially coincident with the target inter-vehicle distance; and performing a vehicular deceleration control in accordance with the inter-vehicle distance from the vehicle to the preceding vehicle immediately before a time point at which the trapped preceding vehicle has not been detected when the detected vehicular velocity falls in a low vehicular velocity region lower than a predetermined velocity value and the trapped preceding vehicle has not been detected.

* * * * *